Figure 12:
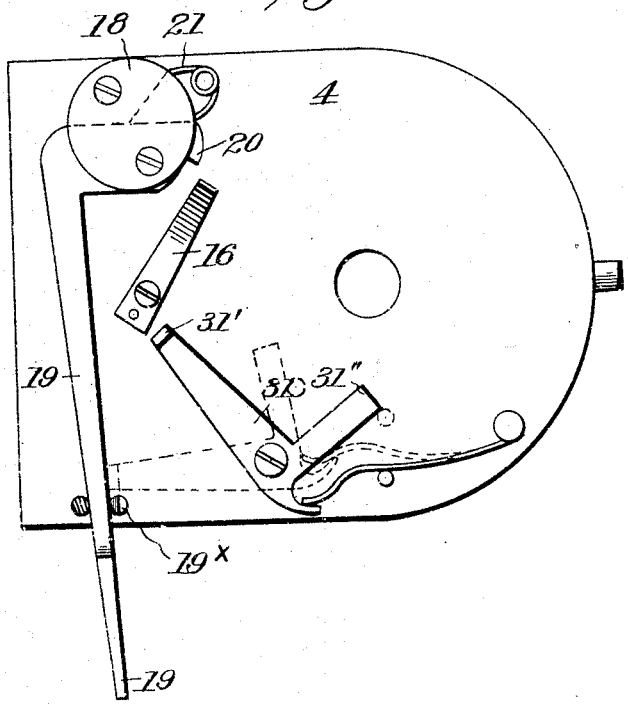

J. M. CHAPPEL.
AUTOMATIC TIME CONTROLLED OPERATING MECHANISM.
APPLICATION FILED JAN. 5, 1906. RENEWED JULY 22, 1909.
946,792.
Patented Jan. 18, 1910.
4 SHEETS—SHEET 1.
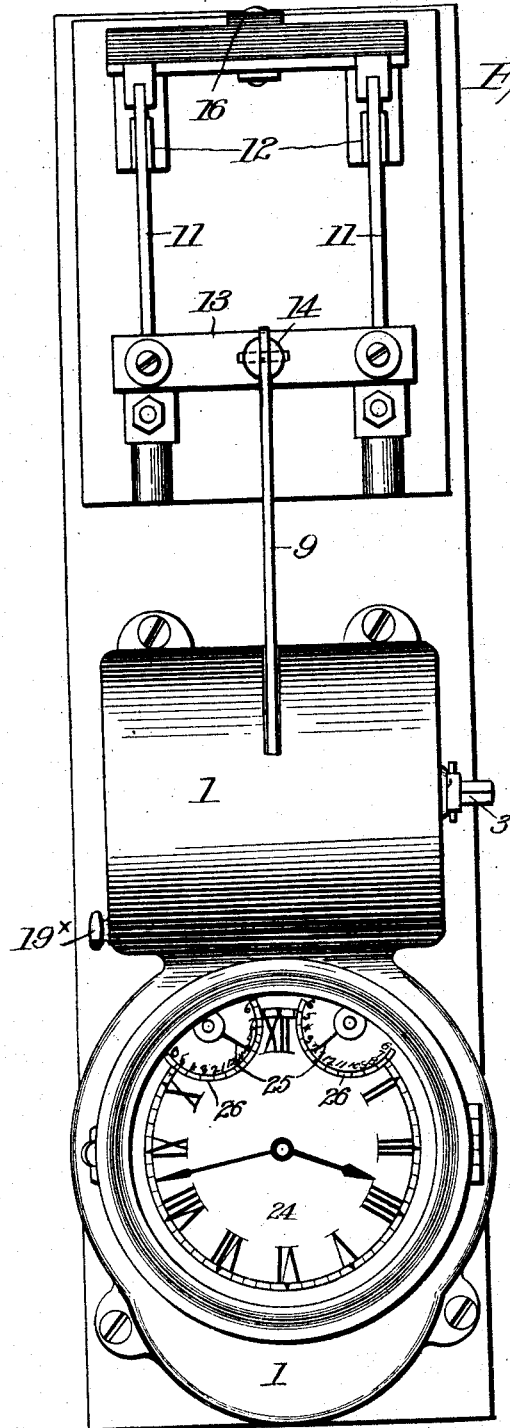
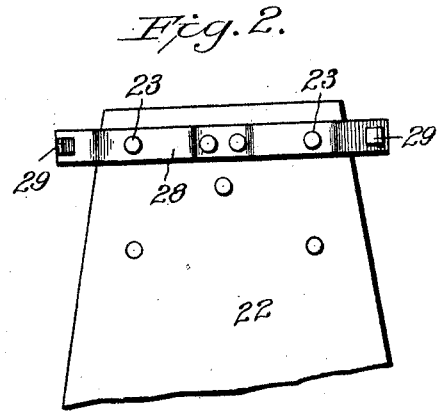
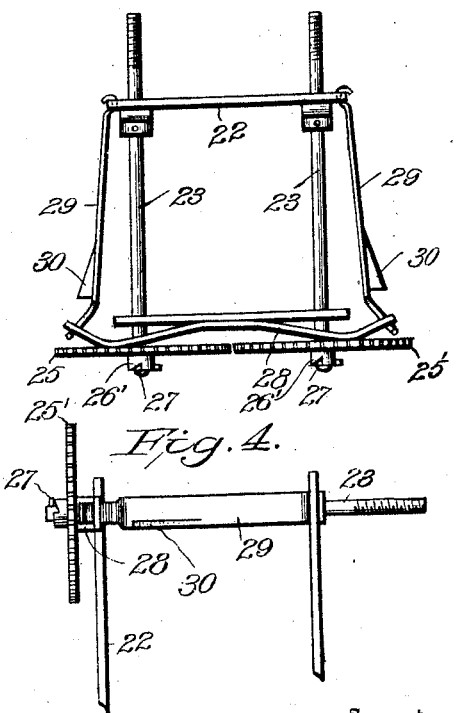

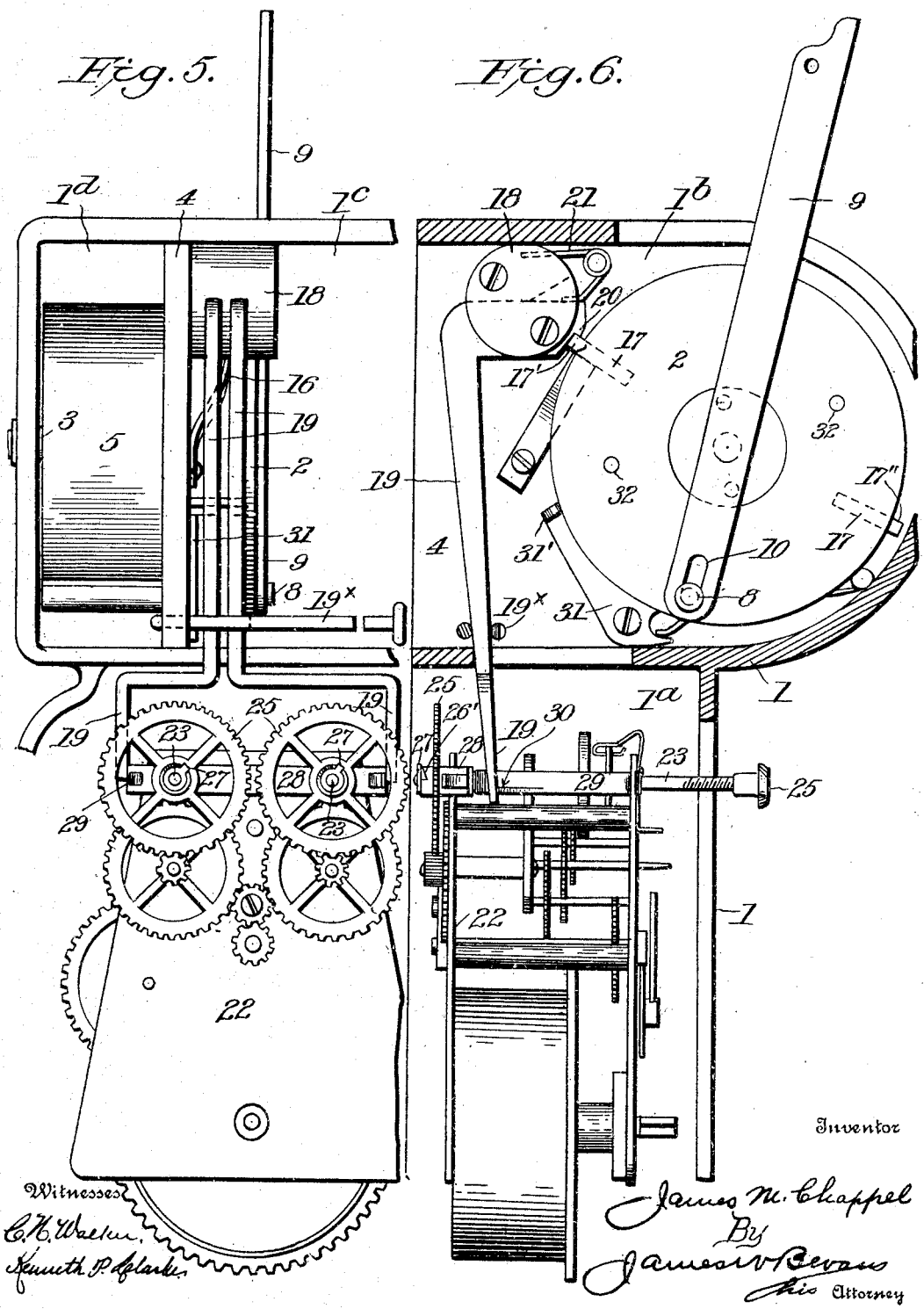

J. M. CHAPPEL.
AUTOMATIC TIME CONTROLLED OPERATING MECHANISM.
APPLICATION FILED JAN. 5, 1906. RENEWED JULY 22, 1909.
946,792.
Patented Jan. 18, 1910.
4 SHEETS—SHEET 3.
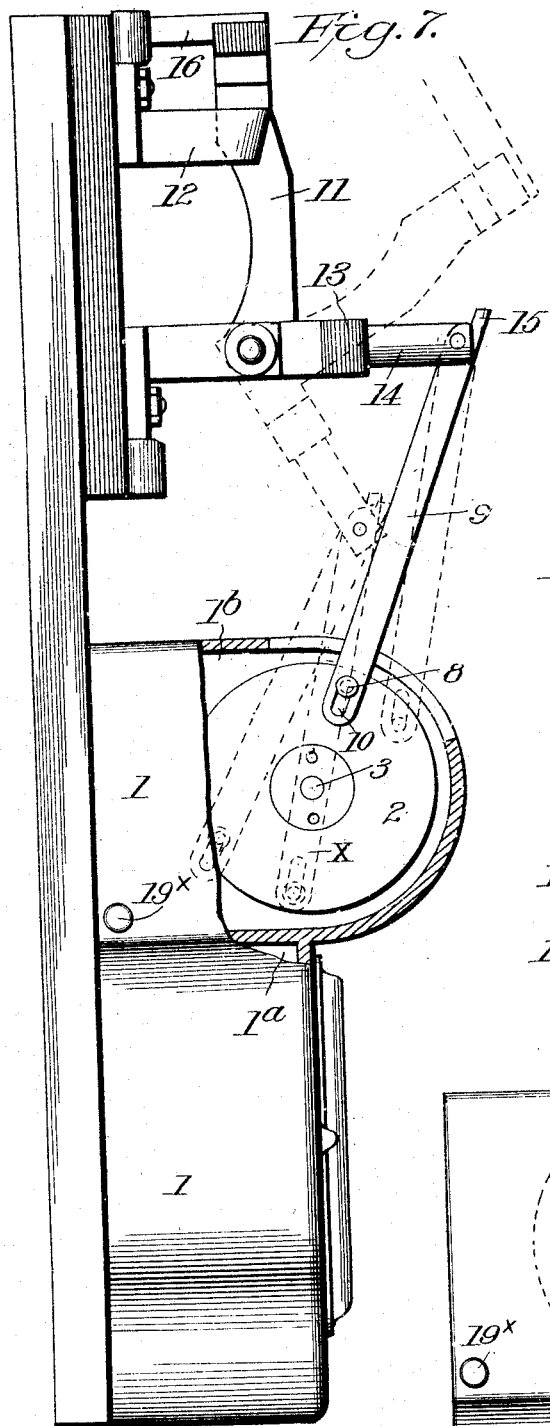
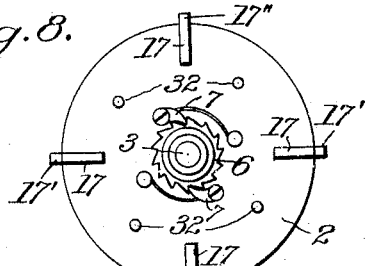
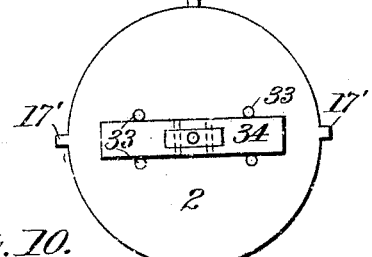
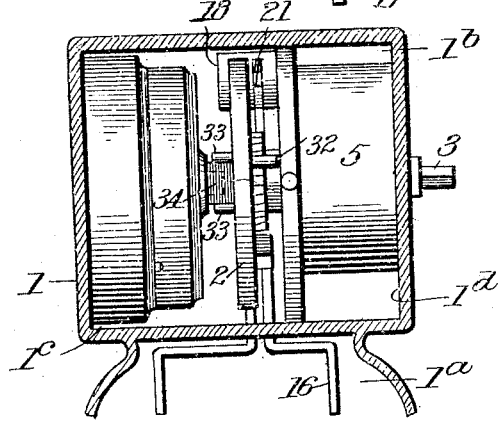
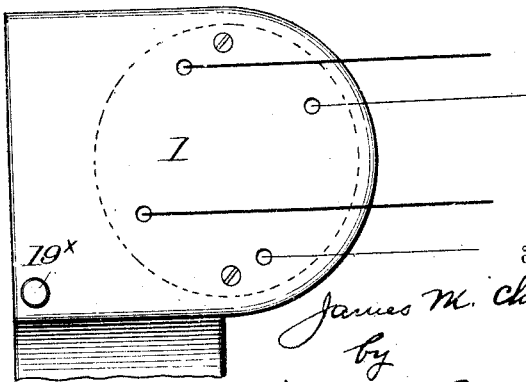
Witnesses
Inventor
James M. Chappel
by
James W. Bevans
Attorney J. M. CHAPPEL.
AUTOMATIC TIME CONTROLLED OPERATING MECHANISM.
APPLICATION FILED JAN. 5, 1906. RENEWED JULY 22, 1909.

946,792.

Patented Jan. 18, 1910.
4 SHEETS—SHEET 4.

Witnesses
C. H. Walker.
Kenneth P. Clarke.

Inventor
James M. Chappel
By James W. Bevans
his Attorney

UNITED STATES PATENT OFFICE.

JAMES M. CHAPPEL, OF DALLAS, TEXAS.

AUTOMATIC TIME-CONTROLLED OPERATING MECHANISM.

946,792. Specification of Letters Patent. Patented Jan. 18, 1910.

Application filed January 5, 1906, Serial No. 294,735. Renewed July 22, 1909. Serial No. 509,065.

*To all whom it may concern:*

Be it known that I, JAMES M. CHAPPEL, a citizen of the United States, residing at Dallas, in the county of Dallas and State of Texas, have invented new and useful Improvements in Automatic Time-Controlled Operating Mechanisms, of which the following is a specification.

This invention relates to improvements in time-controlled mechanisms for automatically operating at predetermined times, electric switches, and other devices, locking and unlocking doors of warehouses, stores, and reformatories and other like institutions, and for controlling water, gas, or other supplies, the objects being to provide, first, an operating mechanism of this character which is simple in construction, being composed of a minimum number of parts, and which is reliable and positive in its action; second, means for preventing injury to the clock-mechanism, which controls the action of the operating-mechanism, by jarring, or the blow caused by the action of the parts in operating the device to which the mechanism is connected; third, an operating mechanism of this character in which the action is positive, so that a complete movement of the switch or other device will be insured, thus preventing, in the case of the switch, the formation of an arc, or when used in connection with a water or gas supply, any leakage of gas, or water, by a partial closing of the stop-cock or other controlling valve; fourth, an operating mechanism so constructed that it will be positively locked in its several positions until automatically released by the clock-mechanism; fifth, an operating mechanism which is so constructed that it is capable of ready attachment to various devices with which it may be desired to use the same, and sixth, means for locking the mechanism from operation without interfering with or disturbing the action of the clock-mechanism.

With the above object in view, the invention consists in the novel features of construction hereinafter fully described, particularly pointed out in the claims, and clearly illustrated by the accompanying drawing, in which I have illustrated my invention as applied to an electric switch.

Figure 15:
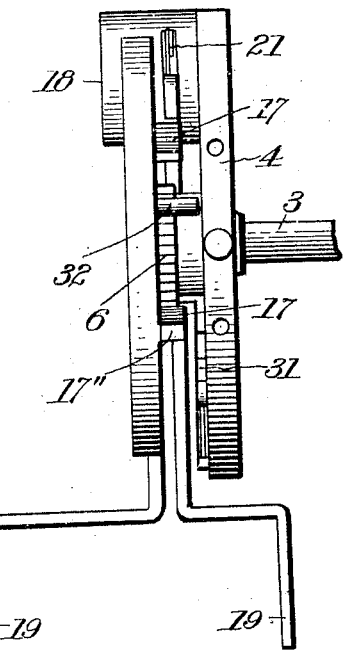
Figure 13:
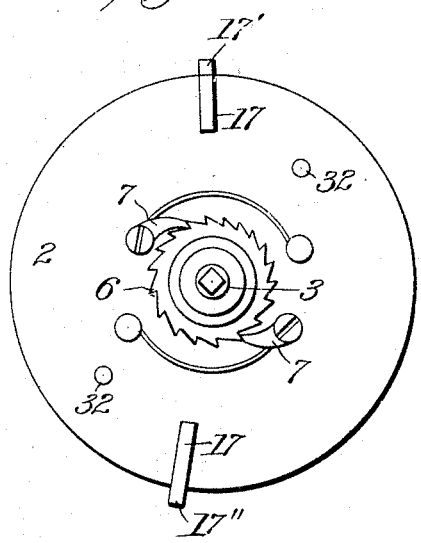
Figure 14:
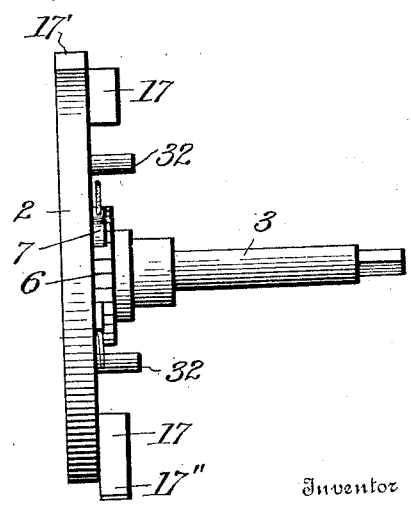

In said drawings,—Figure 1 is a front elevation of my improved operating mechanism, shown in connection with an electric switch of the bar type; Figs. 2, 3, and 4, detail views of the tripping or releasing mechanism carried by the clock-mechanism; Fig. 5, a rear elevation of my improved operating mechanism, the wall of the casing being removed to show the arrangement of the parts; Fig. 6, a side elevation of the same; Fig. 7, a side elevation of my improved operating mechanism in connection with the bar-switch, the positions of the link in effecting the swinging of the movable part of the switch to open the circuit being shown in dotted lines; Figs. 8 and 9, face views of the disk showing a modified construction to be used in connection with a snap-switch; Fig. 10, a sectional view through the casing, showing the mechanism in connection with a snap-switch; Fig. 11, a view of a portion of the casing showing the manner of wiring when my invention is used in connection with a snap-switch; Fig. 12, a face view of the removable plate with the stop-levers in position thereon, together with the device for preventing jarring of the clock-mechanism; Fig. 13, a face view of the disk used in the operating device in connection with the bar-switch; Fig. 14, an edge view of the same; Fig. 15, a top-plan view of the removable plate, the disk, stop-levers and other parts carried by said plate.

Referring now more particularly to the drawings, 1 designates a suitable casing inclosing the clock-mechanism and the switch-operating mechanism controlled thereby, said casing being divided into two compartments, 1ª and 1ᵇ to receive said mechanisms. The operating mechanism consists of a disk 2 rotatably mounted on the inner end of a shaft 3, which is supported by the wall of the casing and a plate 4 removably secured in said compartment 1ᵇ and dividing the same into two compartments, 1ᶜ and 1ᵈ, in the former of which, the disk and other coacting mechanism is placed and in the latter, a motor-spring 5, one end of which is attached to the shaft, and the other to a suitable stud carried by the end wall of the casing. Attached to the shaft adjacent to said disk is a ratchet-wheel 6, engaged by spring-pressed pawls 7 carried by the disk, whereby said disk is locked to the shaft during the rotation of the latter in one direction and released therefrom upon rotation thereof in a reverse direction in winding the motor-spring. The end of the shaft projects from said casing and is squared to receive a key for winding said spring. Projecting from the outer face of said disk is a headed pin or stud 8 arranged eccentrically thereon, to which an operating-member or link 9 is loosely connected by means of a slot 10 through which said stud projects. The opposite end of this operating-member is connected with the switch or other device to be operated, an electric switch being illustrated.

The switch shown in Figs. 1 and 7, is a bar-switch, having the usual swinging part or contact 11, which is brought into and out of engagement with the fixed part or contact 12, to make and break the circuit, and in adapting my invention to this form of switch, I attach to movable part 11 near its pivotal end, a cross-bar 13 of insulating material, projecting centrally from which is a post 14 to which the opposite end of the operating-member or link is pivotally connected.

The movement of the movable part of the switch in opening or breaking the circuit is limited by the contact of a projection 15 on the end of the link with the bottom-wall of the slot in the post 14 in which the link is pivotally mounted, while the movement thereof in closing or making the circuit is limited by the contact of a stop 16 of insulating material secured to the movable part with the base on which said switch is mounted.

From the above description, it will be seen that the disk, during a portion of its rotation, will operate said link or member 9 to swing the movable part of the switch in one direction and during the remainder of the rotation thereof, will operate said link to swing said movable part in a reverse direction, the several positions of the link and movable switch-part being shown in solid and dotted lines in Fig. 7. By reason of the pin-and-slot connection between the link and disk, in opening and closing the switch, the disk will rotate a certain distance before the pin or stud strikes against the end-wall of the slot, thus giving to the link a sudden or hammer blow, by reason of which the action is quick and positive, whereby arcing is absolutely impossible. Rotation of the disk in a reverse direction is prevented by a leaf-spring 16 secured at one end to the plate 4, and bearing at its opposite end against projections 17 formed on the disk.

Pivotally mounted intermediately of their ends in a suitable post or bearing 18 carried by plate 4, are two stop-levers or members 19 arranged parallel with each other, said members having notched portions 20 on one side of their pivots, pressed normally by springs 21 to project in the path of projections 17' and 17'' to hold the disk from rotation until tripped by the clock-mechanism, said projections 17' and 17'' being arranged on the periphery of the disk on opposite sides of its center, projection 17' being disposed to engage the shoulder or notch of one of the stop-levers and projection 17'' the notch of the other stop-lever. The opposite ends of said stop-levers project through suitable slots in the dividing wall of the casing into compartment 1ª, containing the time-controlling or clock-mechanism 22 which is of the eight-day type.

Rotatably mounted in the frame of the clock-mechanism, are shafts 23 which at one end project through the dial 24 and carry small hands 25 coacting with smaller dials 26 upon the dial 24, which are marked with graduations indicating hours and fractions thereof, one of these small hands and its dial being used to set the mechanism for opening the switch, and the other for setting the mechanism to close the switch. These shafts are rotated to set the mechanism by means of knobs on their projecting ends. Loose on the opposite ends of said shafts are gears 25' which mesh with the train of gears of the clock-mechanism, said gears having notched hubs 25, the notches of which are formed with inclined or cam-walls 26'. The shafts are provided on their ends with projections 27 which engage said notches of the hubs for the purpose presently to be described. The notched hubs are normally held in engagement with the projections 27 by a spring 28 secured at its central portion to the frame of the clock-mechanism and bent outwardly adjacent to its ends to bear against the gears 25', as clearly shown in Fig. 3. These spring-arms at their outer ends are bent away from the gears and slotted to receive the ends of spring detents 29 which at their opposite ends are connected to the frame of the clock-mechanism. The ends of said detents which project into the slots of the arms of the spring 28 are inclined to form cams, whereby the movement of said arms to and from the frame of the clock-mechanism will effect the lateral movement of the detents to move shoulders 30 formed thereon out of contact with the ends of stop-levers 19 which, as before stated, project into compartment 1ᵇ of the casing and normally rest against said shoulders, thus releasing said levers and permitting the operating mechanism to actuate the movable switch-member. This movement of the spring-arms is effected at the times indicated by the hands 25 on the small dials, through the action of the clock-mechanism which actuates the gears 25', during the rotation of which the coaction of the inclined or cam-walls of the notches on the hub 25 with the projections 27 causes said gears to move outwardly from the frame of the clock-mechanism which movement effects a corresponding movement of the spring-arms. By the tripping-mechanism above described, the triggers 19 are released instantly without any jar or strain to the clock-mechanism.

From the above description, it will be seen that to set the mechanism, the two shafts are rotated until the hands carried thereby are brought to the desired point upon the dials with which they coact. This brings the projections 27 carried by said shafts in such positions relative to the notched hubs 25, that the stop-levers will be released at the times indicated. Assuming the switch to be closed, as illustrated in solid lines in Fig. 7, the stop-lever holding the disk from rotation will be released by the clock-mechanism at the time for which the tripping-mechanism controlling the stop-lever has been set. As soon as the stop-lever has been released, by the tripping mechanism, said disk will be rotated by the action of its spring, moving the link to the position shown in dotted lines in said Fig. 7, as at $x$. This movement of the link will effect the movement of the swinging switch-member to open the switch and break the circuit. At approximately the completion of the movement of the disk to effect the opening of the switch, the notch in the other stop-lever is engaged by the other projection 17" carried by the disk and the latter held from further rotation, the opposite end of the stop-lever being in engagement with the shoulder 30 of the detent 29. The disk is thus held from rotation until the clock-mechanism actuates the tripping-mechanism for that stop-lever at the time for which it is set, and releases the same. As soon as said lever is released, the disk rotates and moves the link in a reverse direction to effect the closing of the switch, its rotation after the closing has been effected being stopped by the contact again of the projection 17' carried thereby with the notch in the other stop-lever.

It is apparent that the forward ends of the stop-levers being in engagement with the shoulders of the tripping mechanism when the rotation of the disk is stopped by the contact of the projections carried thereby with the notches in opposite ends of said levers, there would be a severe blow or jar to the clock-mechanism, which would injure it and render it inoperative. To prevent this, I mount upon a plate 4, an intermediately-pivoted spring-pressed lever 31 having one of its arms 31' bent to extend beneath said stop-levers when the lever is swung on its pivot in one direction, said lever constituting an anvil to receive the blow or jar. For effecting the movement of this lever to bring it into position to receive said blow, I provide the disk with pins or studs 32 projecting from its inner face, which pins are so positioned as to engage the other arm 31" of the lever and effect the movement of the latter on its pivot to bring the anvil-end beneath the stop-levers just as the projections of the disk strike the shoulders or notches in the latter.

For locking the operating-mechanism from operation without disturbing the action of the clock-mechanism, I provide a locking member 19$^\times$ mounted to slide on the plate 4, and having one of its ends projecting from the casing and provided with a suitable knob whereby it may be operated and formed at its opposite end with an arm to extend beneath the stop-levers, thus preventing the movement of the latter to release the disk. The sliding locking-member, also, constitutes a stop when not locking the stop-levers for the purpose of limiting the upward movement of the levers.

When my improved operating mechanism is used in connection with a switch of the snap type as illustrated in Fig. 10, the link is dispensed with, and the disk provided on its outer face with two pairs of spaced projections 33 to receive therebetween a bar 34 of insulating material which is secured to the stem of the movable part of the switch in place of the ordinary finger portion. The projections 17' and 17" are duplicated, for the reason that the snap-switch is operated by a quarter revolution of the disk instead of a half-revolution as is the case with a bar switch. The projections or studs 32 carried by the disk which operate the intermediately pivoted lever 31 are also necessarily duplicated. The operation of the mechanism is exactly the same as in the first instance with the exception, of course, that the disk effects the operation of the movable part of the switch without the intervention of the link. The switch is placed within the casing containing the operating mechanism and the wiring extended through suitable openings in the casing.

As illustrated in Figs. 1 and 7, where the bar-switch is used, the casing containing the clock-mechanism and the operating mechanism, and the switch itself, may be secured to a single base.

As before stated, I do not limit the use of the invention to electric switches, for the reason that the disk might be connected either through the medium of the link or by any other desired part or parts with the sliding bolt of a lock in order to effect the movement of the same to lock or unlock a door, the invention in this connection being especially useful in stores, warehouses, prisons, and other places. The disk may also be connected with the stop-cock or valve of a water, gas, or other supply, for the purpose of automatically turning the same on or off, at predetermined times. In either case, by reason of the pin-and-slot connection between the disk and the link, the movement of the part to be operated would be entirely completed, as before stated, thereby preventing in the case of a water or gas supply, any leakage, or in the case of a door-lock the partial movement of the bolt.

By reference to Fig. 7, it will be seen that the relative arrangement of the parts is such that it is impossible to effect the movement of the disk by hand, from the exterior of the casing, so that the mechanism is securely locked until automatically operated at the desired time.

Having thus fully described my invention, what I claim as new, and desire to secure by Letters Patent of the United States, is:—

1. In a time-controlled automatic operating mechanism, a spring-actuated member, a link operatively connecting said member with the device to be operated, the connection between the spring-actuated member and the link being a pin-and-slot connection, a stop-member holding said member from movement, a detent holding said stop-member in engagement with the spring-actuated member, a clock-mechanism, and means actuated by the clock-mechanism at predetermined times for moving said detent to release said stop-member.

2. In a time-controlled automatic operating mechanism, a spring-actuated member, an operative connection between said member and the device to be operated, means for normally holding said member from movement, a clock-mechanism, tripping mechanism normally engaging said holding means actuated by the clock-mechanism at predetermined times for disengaging said holding means to release the said spring-actuated member, and means for relieving the clock-mechanism from the blow or jar caused by the engagement of the holding means with the spring-actuated member after the latter has effected the movement of the device with which the operating mechanism is connected.

3. In a time-controlled automatic operating-mechanism, a spring-actuated member, an operative connection between said member and the device to be operated, means for normally holding said member from movement, a clock-mechanism, tripping mechanism normally engaging said holding means actuated by the clock-mechanism at predetermined times for disengaging said holding means to release said spring-actuated member, and means actuated by said spring-actuated member for relieving the clock-mechanism from the blow or jar caused by the engagement of the holding means with the spring-actuated member after the latter has effected the movement of the device with which the operating mechanism is connected.

4. In a time-controlled automatic operating mechanism, a spring-actuated rotary disk, an operative connection between the same and the device to be operated, intermediately-pivoted stop-levers having engaging-portions on one side of their pivots for alternately engaging and holding said disk from movement, a clock-mechanism, detents for engaging and holding the opposite ends of said levers, and tripping-mechanism actuated by said clock-mechanism at predetermined times to disengage said detents from said levers.

5. In a time-controlled automatic operating mechanism, a spring-actuated member, an operative connection between the same and the device to be operated, intermediately-pivoted stop-levers alternately engaging and holding said spring-actuated member from movement, a clock-mechanism, detents for engaging and holding said stop-levers in engagement with the spring-actuated member, tripping mechanism actuated at predetermined times by the clock-mechanism to disengage said detents from the stop-levers, and a member moved by said spring-actuated member during its movements to operate the device with which the mechanism is connected in position to be engaged by the stop-levers as the latter are engaged by the spring-actuated member, to relieve the clock-mechanism from the blow or jar incident to this engagement of the parts.

6. In a time-controlled automatic operating mechanism, a spring-actuated member, an operative connection between the same and the device to be operated, intermediately-pivoted stop-levers alternately engaging and holding said spring-actuated member from movement, a clock-mechanism, detents for engaging and holding said stop-levers in engagement with the spring-actuated member, tripping mechanism actuated at predetermined times by the clock-mechanism to disengage said detents from the stop-levers, and a swinging-member moved by said spring-actuated member during its movement to operate the device with which the mechanism is connected in position to be engaged by the stop-levers as the latter are engaged by the spring-actuated member, to relieve the clock-mechanism from the blow or jar incident to this engagement of the parts.

7. In a time-controlled automatic operating mechanism, a spring-actuated member, an operative connection between the same and the device to be operated, stop-levers adapted to alternately engage and hold said spring-actuated member from movement, a clock-mechanism, detents engaging and holding said stop-levers, tripping-mechanism actuated at predetermined times by the clock-mechanism to disengage said detents from the stop levers, and a pivoted member moved by said spring actuated member during its movement to operate the device with which the mechanism is connected in position to be engaged by the stop-levers as the latter are engaged by the spring-actuated member, to relieve the clock-mechanism from the blow or jar incident to the engagement of the parts.

8. In a time-controlled automatic operating mechanism, a spring-actuated rotary disk, an operative connection between said disk and the device to be operated, intermediately-pivoted stop-levers adapted to alternately engage and hold said disk from rotation, a clock mechanism, detents for engaging and holding said stop-levers in engagement with the spring-actuated disk, tripping mechanism actuated at predetermined times by the clock-mechanism to disengage said detents from the stop-levers, and an intermediately pivoted lever having an anvil portion adapted to be brought in position to be engaged by the stop-levers as the latter are engaged by the disk, and means carried by the disk for engaging said lever and swinging the same to said position to receive the blow of the stop-levers.

9. In a time-controlled automatic operating mechanism, a spring-actuated rotary disk, an operative connection between said disk and the device to be operated, spring-pressed intermediately-pivoted stop-levers formed with notched engaging portions on one side of their pivots, projections carried by the disk adapted to alternately engage the notched engaging-portions of said levers, a clock-mechanism, detents adapted to engage and hold the opposite ends of said stop-levers, tripping mechanism actuated at predetermined times by the clock-mechanism to disengage said detents from the stop-levers, an intermediately pivoted lever having an end formed with an anvil portion, and projections carried by said disk adapted to engage said pivoted member and swing the anvil portion thereof in position to be engaged by the stop-levers at approximately the moment of engagement of the projections of the disk with the notched engaging ends of said levers, for the purpose of relieving the clock-mechanism from the blow or jar incident to the engagement of said levers with the disk.

10. In a time-controlled automatic operating mechanism, a spring-actuated member, an operative connection between the same and the device to be operated, a stop-member engaging and holding said spring-actuated member from movement, a detent engaging and holding said stop-member in engagement with the spring-actuated member, a clock-mechanism, means actuated by the clock-mechanism at predetermined times for moving said detent to release said stop-member, said means comprising a shaft, a laterally movable gear loose thereon, meshing with the gear of the clock-mechanism, coacting cams carried by said laterally movable gear and its shaft for effecting the lateral movement thereof, and means actuated by the lateral movement of said gear for effecting the movement of the detent.

11. In a time-controller automatic operating mechanism, a spring-actuated member, an operative connection between said member and the device to be operated, a stop-member normally engaging and holding said spring-actuated member from movement, a detent engaging and holding said stop-member in engagement with the spring-actuated member, a clock-mechanism, means actuated by said clock-mechanism for moving said detent to release said stop-member at predetermined times, comprising a shaft, a laterally-movable gear rotatable thereon meshing with the gear of the clock-mechanism, co-acting cams carried by the laterally movable gear and shaft for effecting the lateral movement thereof, a laterally movable arm carrying said detent and formed with a cam-portion and a spring-member actuated by the lateral movement of said gear and co-acting with the cam-portion of said movable arm for effecting the movement of the detent.

12. In a time-controlled automatic operating mechanism, a spring-actuated rotary disk, an operative connection between said disk and the device to be operated, intermediately pivoted stop-levers alternately engaging and holding said disk from rotation, detents engaging and holding said stop-members in engagement with the spring-actuated disk, a clock-mechanism, means actuated by said clock mechanism at predetermined times for moving said detents to release the stop-levers comprising shafts, laterally movable gears rotatable thereon and meshing with the gear of the clock-mechanism, coacting cams carried by the laterally movable gears and the shafts for effecting the lateral movement thereof, laterally movable arms carrying said detents and formed with cam portions, and a spring-member actuated by the lateral movement of said gears and co-acting with the cam-portions of said movable arms for effecting the movements of the detents.

13. In a time-controlled automatic operating mechanism, the combination with a spring-actuated member, operative connection between said member and the device to be operated, means for holding said member from movement, of a clock-mechanism, means actuated by the clock-mechanism at predetermined times for releasing said member, and means for locking the time-controlled operating-mechanism from operation without disturbing the regular action of the clock-mechanism.

In testimony whereof I affix my signature, in presence of two subscribing witnesses.

JAMES M. CHAPPEL.

Witnesses:
H. E. WILLIAMS,
R. ST. P. SMITH.